(12) United States Patent
Leblanc

(10) Patent No.: US 6,252,439 B1
(45) Date of Patent: Jun. 26, 2001

(54) CURRENT LEVEL DETECTOR DEVICE FOR PROTECTING A CIRCUIT AGAINST ALTERNATING CURRENT OVERCURRENTS

(75) Inventor: Didier Leblanc, Limoges (FR)

(73) Assignees: Legrand; Legrand SNC, both of Limoges (FR)

(*) Notice: Subject to any disclaimer, the term of this patent is extended or adjusted under 35 U.S.C. 154(b) by 0 days.

(21) Appl. No.: 09/301,012

(22) Filed: Apr. 28, 1999

(30) Foreign Application Priority Data

Apr. 28, 1998 (FR) .................................................. 98 05296

(51) Int. Cl.[7] .................................................. H03B 1/00
(52) U.S. Cl. .................................................. 327/104; 327/330
(58) Field of Search .................................... 302/258, 259, 302/330, 104, 508; 361/93.9, 56, 91, 93.7, 93.1, 100

(56) References Cited

U.S. PATENT DOCUMENTS 3,743,919 * 7/1973 Bingley .......................... 321/69 R
5,315,651 * 5/1994 Rahamim et al. .................... 379/412
5,864,458 * 1/1999 Duffy et al. ........................ 361/93

FOREIGN PATENT DOCUMENTS 1538286 2/1970 (DE) ............................... H02H/7/22
2279189 12/1994 (GB) ............................... H02H/3/33

* cited by examiner

Primary Examiner—Tuan T. Lam
Assistant Examiner—Hiep Nguyen
(74) Attorney, Agent, or Firm—Young & Thompson

(57) ABSTRACT

A current level detector device for protecting a circuit against alternating current overcurrents includes resistor arrangements that are inserted into the circuit to be protected and two detector cells, one for each half-wave of the current. The detector cells are similar to each other and are connected to the terminals of the resistor arrangements. By means of a crossover circuit, the two detector cells are both connected to the terminals of the same resistor arrangements. Applications include protecting circuits using power semiconductors.

8 Claims, 2 Drawing Sheets

CURRENT LEVEL DETECTOR DEVICE FOR PROTECTING A CIRCUIT AGAINST ALTERNATING CURRENT OVERCURRENTS

BACKGROUND OF THE INVENTION

1. Field of the Invention

The present invention is generally concerned with protecting a circuit of any kind against overcurrents such as those caused by a short circuit, for example.

It is more particularly directed to the situation in which instead of using a fuse of any kind to provide this protection, in the conventional way, where the fuse must be changed each time it operates, the current is read, or to be more precise, the current level is detected, for appropriate intervention in the circuit to be protected as soon as the current level reaches a particular threshold.

2. Description of the Prior Art

The current level detector devices usually employed use resistor means inserted into the circuit to be protected and serving as a sensor and a detector cell shunting the resistor means.

In alternating current circuits there are two feasible solutions.

A first solution uses only one detector cell and rectification with no threshold is therefore employed.

However, this solution has the disadvantage of requiring considerable and costly post-processing of the information collected.

A second solution uses two detector cells, one for each half-wave of the current, and each of the two detector cells is connected to specific resistor means in a mirror type circuit.

This has the advantage of simplifying the required processing of the information collected.

In practice the two detector cells employed are similar and each has two inputs connected to the corresponding resistor means.

The resistor means can in some cases be a low value resistor and in this case heat dissipation within the resistor advantageously remains moderate.

This is not always the case, however, especially if the associated detector cell uses a selectively operable switch, for example a transistor, which is triggered by applying a sufficient potential to its base circuit.

Heat dissipation in the resistor means can remain acceptable if the power in the circuit to be protected remains moderate, however.

This is not the case for higher powers, for example if the circuit to be protected uses power semiconductors.

A general aim of the present invention is an arrangement providing a very simple and effective way to reduce heat dissipation in this case, and which also has other advantages.

SUMMARY OF THE INVENTION

To be more precise, the present invention consists in a current level detector device for protecting a circuit against alternating current overcurrents, including resistor means adapted to be inserted into the circuit to be protected and two similar detector cells, one for each half-wave of the current, connected to the resistor means at first and second inputs, wherein the two detector cells are both connected by a crossover circuit to first and second terminals of the same resistor means, one of the central cells is connected to the first terminal at its first input and to the second terminal at its second input and the other detector cell is connected to the first terminal at its second input and to the second terminal at its first input.

Briefly, in accordance with the invention the resistor means employed are advantageously operative in both current directions, without any rectification.

Accordingly, although the resistor means retain the value necessary for the required detection to be assured on each half-wave, it is advantageously possible to halve their value overall.

This reduces heat dissipation commensurately.

The cost and the overall size of the system are also reduced, which is advantageous.

The features and advantages of the invention will emerge from the following description given by way of example with reference to the accompanying diagrammatic drawings.

DETAILED DESCRIPTION OF THE PREFERRED EMBODIMENTS

As shown in the figures, the overall aim is to protect any circuit 10 including a load 11 and connected to an alternating current power supply 12 against overcurrents.

Figure 1:
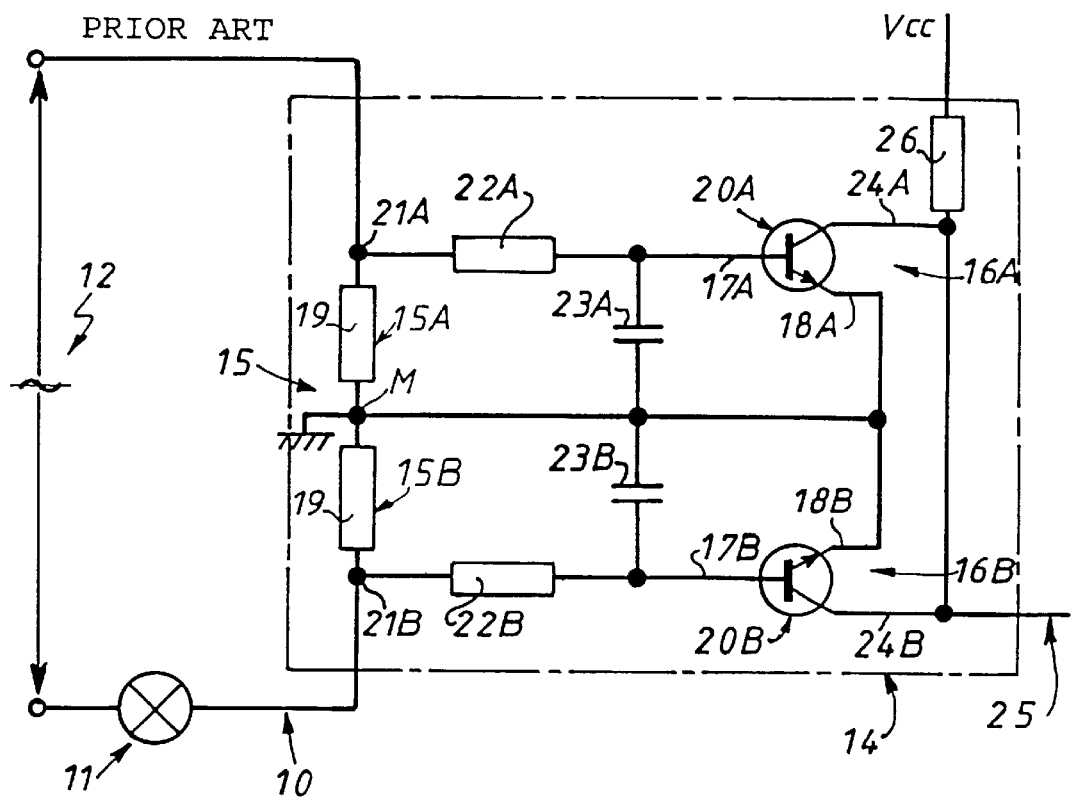
FIG. 1 is a circuit diagram of a prior art current level detector device.

In the prior art, and as shown diagrammatically in FIG. 1, a current level detector device 14 is employed for this purpose, including resistor means 15, here divided into resistor means 15A and resistor means 15B, which are inserted into the circuit 10 to be protected, and two detector cells 16A, 16B, one for each half-wave of the current, similar to each other and having two inputs 17A–17B, 18A–18B connected to the resistor means 15, referred to hereinafter for convenience only as the first input in the case of inputs 17A, 17B and the second input in the case of inputs 18A, 18B.

In the prior art, the connection is of the mirror type with the resistor means 15A associated with the detector cells 16A and the resistor means 15B associated with the detector cell 16B.

In practice the resistor means 15A and the resistor means 15B each comprise a single resistor 19 and the two resistors 19 used for the respective detector cells 16A, 16B have the same value.

In practice the mid-point between the resistor means 15A, 15B, and therefore between the two resistors 19, is grounded.

The detector cells 16A, 16B being similar, their inputs 17A–17B, 18A–18B are each in respective corresponding relationship.

In other words, the first input 17A, 17B is of the same type for both detector cells 16A, 16B, and likewise the second input 18A, 18B.

In the embodiment shown, the two detector cells 16A are in practice identical.

For example, as shown here, they each include a selectively operable switch 20A, 20B, in this instance a transistor, the base of which forms their first input 17A, 17B and the emitter of which forms a second input 18A, 18B.

Their first input 17A, 17B and their second input 18A, 18B are therefore by nature of different types in this case.

The first input 17A of the detector cell 16A is connected to one of the terminals 21A, 21B of the resistor means 15 formed by the resistor means 15A, 15B, in this instance their terminal 21A, and its second input 18A is connected to the mid-point M of the resistor means 15A, 15B.

Conjointly, and in accordance with similar arrangements, the first input 17B of the detector cell 16B is connected to the other of the terminals 21A, 21B of the resistor means 15, here the terminal 21B, and its second input 18B is connected to the mid-point M of the resistor means 15A, 15B forming the resistor means 15.

In practice, the base circuit of the selectively operable switch 20A, 20B of the detector cells 16A, 16B includes a resistor 22A, 22B for limiting the current and a filter capacitor 23A, 23B to eliminate any interference, the other terminal of which is grounded via the mid-point M of the resistor means 15A, 15B.

The collector 24A of the selectively operable switch 20A of the detector cell 16A and that 24B of the selectively operable switch 20B of the detector cell 16B operate in parallel on an output circuit 25 to which an appropriate direct current supply $V_{cc}$ is also connected via a current limiter resistor 26.

During one half-wave of the current in the circuit 10 the detector circuit 16A operates and during the next half-wave the detector cell 16B operates, and so on for each period of the current.

The selectively operable switches 20A, 20B are normally turned off.

If, during one half-wave, the circuit 10 is subject to an overcurrent, however, the selectively operable switch 20A, 20B of the detector cell 16A, 16B concerned is turned on and the output circuit 25 operates accordingly on the circuit 10. This action is not relevant to the present invention and for this reason is not described here.

In accordance with the invention, the two detector cells 16A, 16B are both connected by a crossover arrangement to the terminals of the same resistor means 15 and therefore share the resistor means 15.

As previously, resistor means 15 have terminals 21A, 21B.

In accordance with the invention, one of the detector cells 16A, 16B, for example the detector cell 16A, is connected to the first of these terminals 21A, 21B, in this instance the terminal 21A, at its first input 17A and to the second terminal, in this instance the terminal 21B, at its second input 18A. The other of the detector cells 16A, 16B, and thus the detector cell 16B in this instance, is connected to the first terminal 21A at its second input 18B and to the second terminal 21B at its first input 17B.

Figure 2:
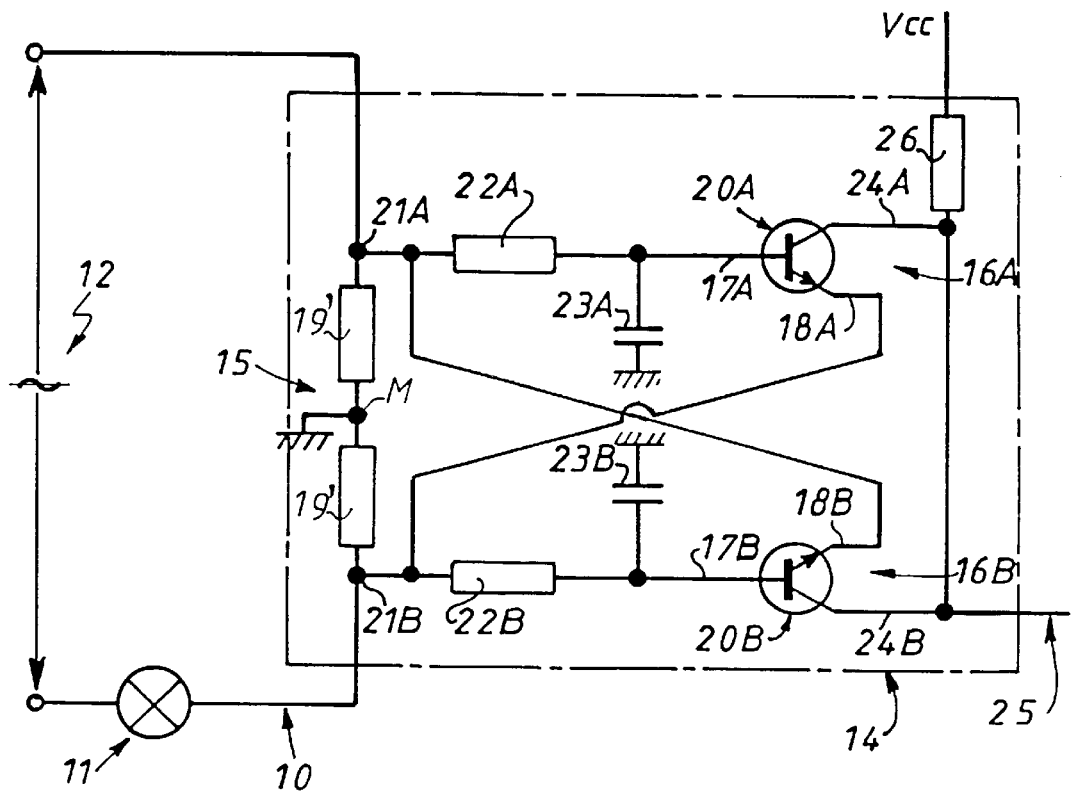
FIG. 2 is a circuit diagram, analogous to that of FIG. 1, of a current level detector device of the invention.

In the embodiment shown in FIG. 2, the resistor means 15 include two resistors 19' of the same value in series.

However, the resistors 19' can clearly and advantageously have a resistance value which is half that of the previous resistors 19.

As shown in FIG. 2, for example, the mid-point M of the two resistors 19' is grounded, as previously, to provide a reference for the emitter of the selectively operable switches 20A, 20B of the detector cells 16A, 16B, i.e. the second input 18A, 18B of the detector cells 16A, 16B.

Figure 3:
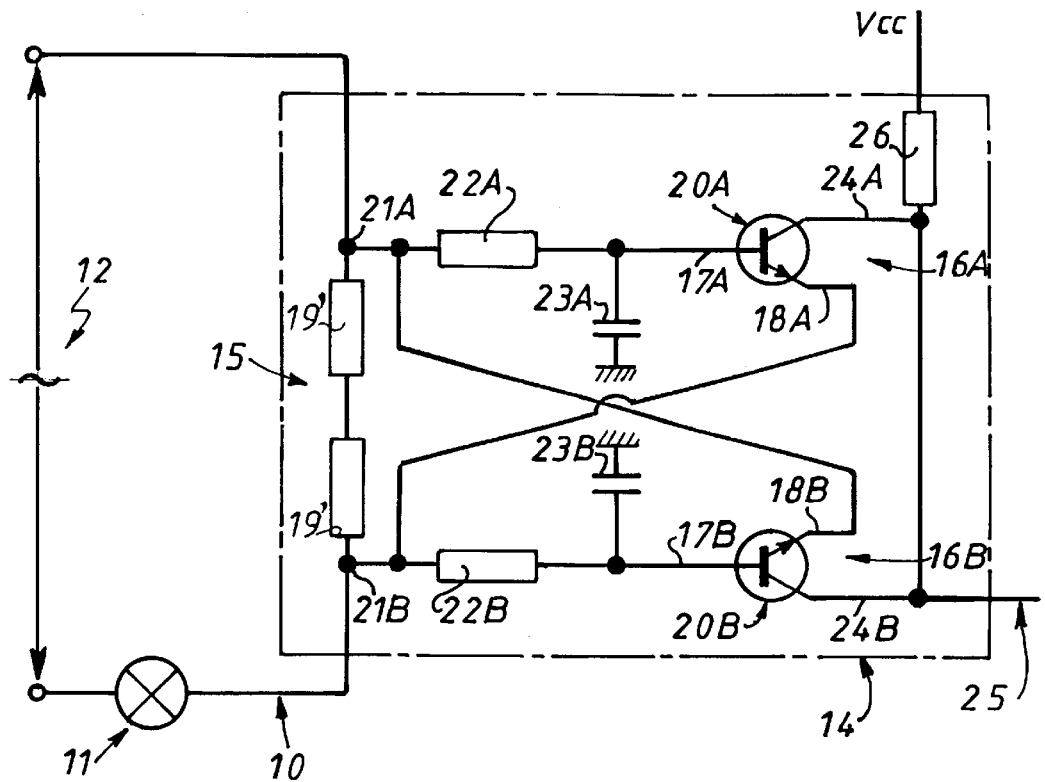
FIGS. 3 and 4 are circuit diagrams, both analogous to that of FIG. 2, each relating to a respective variant of the current level detector device in accordance with the invention.

Alternatively, however, as in FIG. 3, the reference can be eliminated and the overall circuit is then "floating", as it were.

Experience shows that operation is correct, whatever the working conditions of the load 11.

Figure 4:
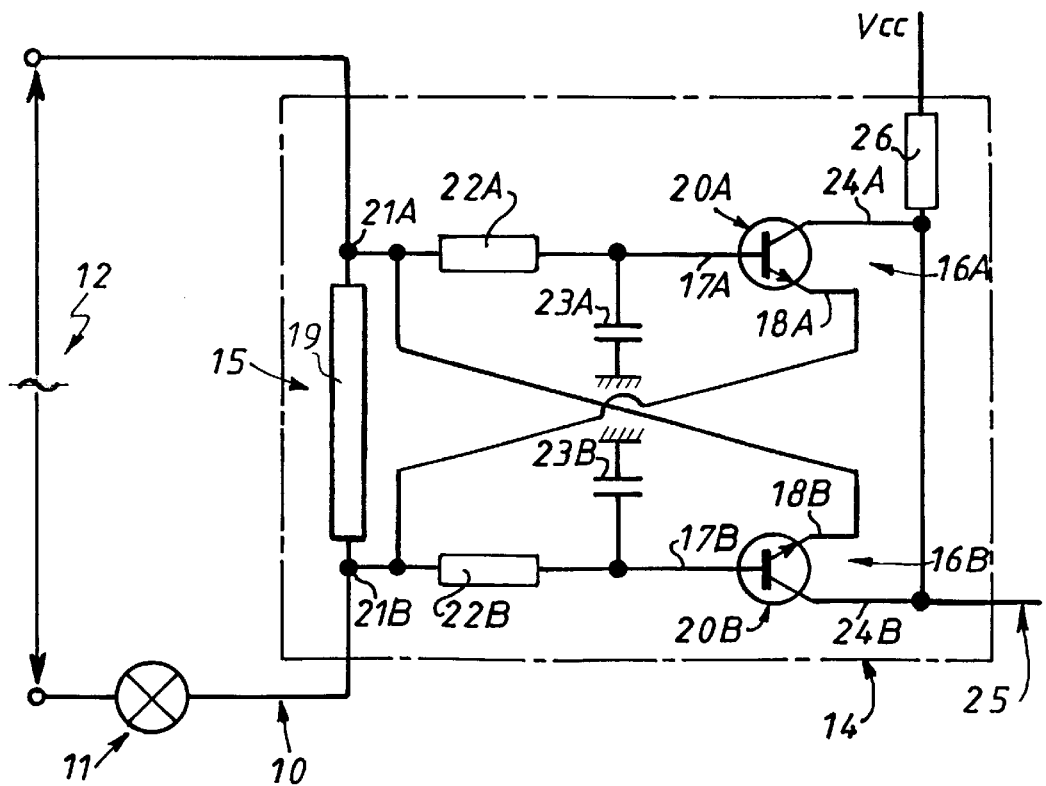

Accordingly, and as shown in FIG. 4, it is possible to replace the two resistors 19' with a resistor 19 of the same value as the previous resistors 19.

Thus in this embodiment the resistor means 15 comprise a single resistor 19.

Otherwise, the arrangements are globally the same as those described with reference to FIG. 1.

In particular, and as previously, the two detector cells 16A, 16B are preferably identical and each includes a selectively operable switch 20A, 20B, in this instance a transistor, the base of which forms their first input 17A, 17B and the emitter of which forms their second input 18A, 18B.

Again as previously, a resistor 22A, 22B and a capacitor 23A, 23B, whose other side is grounded, operate on the base circuit of the selectively operable switch 20A, 20B of each detector cell 16A, 16B.

Finally, the collector 24A, 24B of the selectively operable switches 20A, 20B operate in parallel on an output circuit 25, as previously.

Operation remains the same.

Of course, the present invention is not limited to the embodiments described and shown, but encompasses any variant execution thereof.

There is claimed:

1. A current level detector device for protecting a circuit against alternating current overcurrents, comprising resistor means inserted in a circuit to be protected and two similar or cells transistor detectors for respective half-waves of current, first and second inputs of said transistor detectors being oppositely connected to respective terminals of said resistance means, said first input of one of said transistor detectors being connected to a first of said terminals and said second input of said one transistor detector being connected to a second of said terminals and said second input of the other of said transistor detectors being connected to said first terminal and said first input of said other of said transistor detectors being connected to said second terminal.

2. The current level detector device as claimed in claim 1, wherein said resistor means includes two separate resistors having the same resistance and connected in series.

3. The current level detector device as claimed in claim 2, wherein a midpoint between said two resistors is grounded.

4. The current level detector device as claimed in claim 1, wherein said resistor means comprises a single resistor.

5. The current level detector device as claimed in claim 2, wherein each of said transistor detectors includes a selectively operable switching means including a base which comprises said first input and an emitter which comprises said second input.

6. The current level detector device as claimed in claim 5, wherein a resistor is connected between said first input of the respective transistor detectors and the corresponding one of said terminals of said resistor means.

7. The current level detector device as claimed in claim 5, wherein a grounded capacitor is connected between said first input of each of said respective transistor detectors and the corresponding one of said terminals of said resistor means.

8. The current level detector device as claimed in 6, wherein said second input of said selectively operable switching device of one of said transistor detectors and the second input of said selectively operable switching device of the other of said transistor detectors operate in parallel on an output circuit connected to a direct current supply.

* * * * *